United States Patent [19]

Park et al.

[11] Patent Number: 5,757,565
[45] Date of Patent: May 26, 1998

[54] DIGEST PLAYBACK APPARATUS AND METHOD FOR VIDEO CASSETTE RECORDER

[75] Inventors: Jae Wan Park, Kyungki-do; Soo Young Lee, Seoul, both of Rep. of Korea

[73] Assignee: Goldstar Co., Ltd., Seoul, Rep. of Korea

[21] Appl. No.: 514,388

[22] Filed: Aug. 11, 1995

Related U.S. Application Data

[63] Continuation of Ser. No. 196,831, Feb. 15, 1994, abandoned.

[30] Foreign Application Priority Data

Feb. 16, 1993 [KR] Rep. of Korea .................. 2112/1993
Apr. 28, 1993 [KR] Rep. of Korea .................. 7205/1993
Apr. 29, 1994 [KR] Rep. of Korea .................. 7327/1993

[51] Int. Cl.$^6$ ............................................ G11B 5/00
[52] U.S. Cl. ......................... 360/32; 386/75; 360/8
[58] Field of Search ...................... 360/8, 9.1, 10.1, 360/10.3, 25, 19.1, 36.2, 51, 32; 358/339, 341, 343; 386/68, 75, 76, 77, 81, 85, 90

[56] References Cited

U.S. PATENT DOCUMENTS

| | | | |
|---|---|---|---|
| 4,301,480 | 11/1981 | Kitamura | 360/8 |
| 4,376,874 | 3/1983 | Karban et al. | 360/8 X |
| 4,531,161 | 7/1985 | Murakoshi | 360/19.1 X |
| 4,819,097 | 4/1989 | Azuma et al. | 360/8 X |
| 4,825,303 | 4/1989 | Yablonski et al. | 306/19.1 X |
| 5,010,421 | 4/1991 | Arai | 360/32 |
| 5,023,730 | 6/1991 | Sakata et al. | 360/8 X |
| 5,303,093 | 4/1994 | Kawasaki | 360/32 X |
| 5,568,329 | 10/1996 | Hirohata et al. | 360/32 |

FOREIGN PATENT DOCUMENTS

63-91873  4/1988  Japan.

*Primary Examiner*—Andrew L. Sniezek
*Attorney, Agent, or Firm*—Finnegan, Henderson, Farabow, Garrett & Dunner, L.L.P.

[57] ABSTRACT

Digest playback apparatus and method for a VCR. The digest playback apparatus includes a system controller for outputting a plurality of control signals to control the entire operation of a video cassette recorder system, the plurality of control signals including speed-change multispeed and direction data and audio multispeed change mode ON/OFF data. An analog/digital conversion circuit converts an analog audio signal read by an audio head and then restored to its original state into digital audio data regardless of a speed-change mode. A memory stores the digital audio data from the analog/digital conversion circuit. A digital/analog conversion circuit converts the digital audio data stored in the memory into an analog audio signal, and a control circuit controls the analog/digital conversion circuit, the memory and the digital/analog conversion circuit to output the analog audio signal from the digital/analog conversion circuit as a 1 multispeed which allows the user to accurately listen to the output analog audio signal.

4 Claims, 13 Drawing Sheets

| Picture | | $X_0$ | | $X_1$ | | $X_2$ | | $X_3$ | |
|---|---|---|---|---|---|---|---|---|---|
| A/D conversion & write | | | | | | | | | |
| | used memory | 12a | | 12b | | 12a | | 12b | |
| read & D/A conversion | | | | | | | | | |
| | Picture | | $X_0$ | $X_0$ | $X_1$ | $X_1$ | $X_2$ | $X_2$ | |
| | used memory | | 12a | 12a | 12b | 12b | 12a | 12a | |

FIG.13

DIGEST PLAYBACK APPARATUS AND METHOD FOR VIDEO CASSETTE RECORDER

This application is a continuation of application Ser. No. 08/196,831 filed Feb. 15, 1994, now abandoned.

BACKGROUND OF THE INVENTION

The present invention relates in general to a video cassette recorder (referred to hereinafter as VCR), and more particularly to digest playback apparatus and method for a VCR in which sound is emitted in a speed-change playback mode similarly to that in a normal playback mode.

In a speed-change playback mode of a general VCR, a VCR picture is played back at a faster or slower speed than a normal speed or stopped in a still mode. Namely, in the case where the speed-change playback mode of the VCR is selected by the user, the VCR picture is displayed at faster or slower speed than the normal speed or displayed in a still state. In this case, an audio signal is muted.

Figure 1:
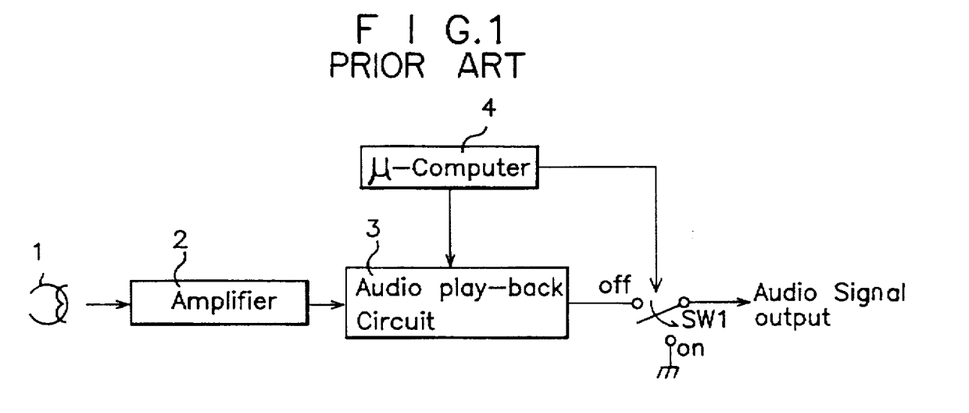
FIG. 1 is a block diagram of a conventional VCR playback apparatus.

Referring to FIG. 1, there is shown a block diagram of a conventional VCR playback apparatus. As shown in this drawing, the conventional VCR playback apparatus comprises an audio head 1 for reading an audio signal recorded on a tape, an amplifier 2 for amplifying the audio signal read by the audio head 1, an audio playback circuit 3 for filtering and FM-demodulating the amplified audio signal from the amplifier 2 to restore the audio signal to its original state, a microcomputer 4 for outputting a plurality of control signals for the recording and playback of the audio signal and controlling an audio mute operation, and a switch SW1 for transferring the audio signal from the audio playback circuit 3 to a speaker (not shown) in response to an audio mute control signal from the microcomputer 4.

Figure 2:
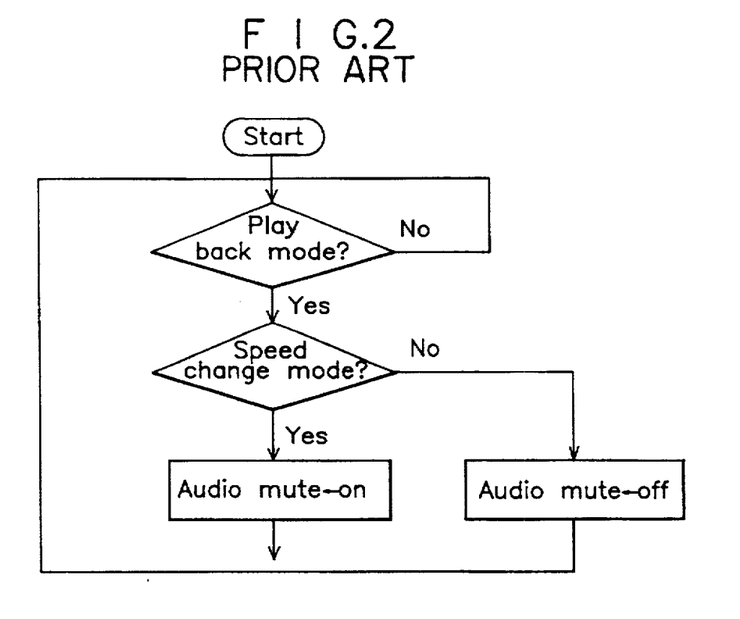
FIG. 2 is a flowchart illustrating an operation of the conventional VCR playback apparatus.

The operation of the conventional VCR playback apparatus with the above-mentioned construction will hereinafter be described with reference to FIG. 2, which is a flowchart illustrating the operation of the conventional VCR playback apparatus.

In the playback mode, the audio signal recorded on the tape is read by the audio head 1 and then amplified by the amplifier 2 because it is low in level. The audio signal amplified by the amplifier 2 is applied to the audio playback circuit 3.

The audio playback circuit 3 filters the output signal from the amplifier 2 to remove a noise component therefrom and demodulates the filtered signal. The resultant audio signal from the audio playback circuit 3 is outputted to the speaker through the switch SW1.

However, in the above-mentioned conventional VCR playback apparatus, the played-back audio signal is emitted in the speed-change playback mode at a speed that cannot be comprehended by a listener. Also in the still mode, the audio mute operation is performed by the microcomputer since the audio signal is not read. For this reason, although the user can view the speed-changed or still picture, he cannot listen to the corresponding sound. As a result, the user cannot grasp a synopsis of the speed-changed or still picture.

SUMMARY OF THE INVENTION

Therefore, the present invention has been made in view of the above problem, and it is an object of the present invention to provide a digest playback apparatus and method for a VCR in which sound is outputted at a 1 multispeed in a speed-change playback mode similarly to that in a normal playback mode, so that the user can listen to the sound and, thus grasp a synopsis of the speed-changed or still picture.

In accordance with one aspect of the present invention, there is provided a digest playback apparatus for a video cassette recorder comprising system control means for outputting a plurality of control signals to control the entire operation of a video cassette recorder system, the plurality of control signals including speed-change multispeed and direction data and audio multispeed change mode ON/OFF data; analog/digital conversion means for converting an analog audio signal read by an audio head and then restored to its original state into digital audio data regardless of a speed-change mode; memory means for storing the digital audio data from said analog/digital conversion means; digital/analog conversion means for converting the digital audio data stored in said memory means into an analog audio signal; and control means for controlling said analog/digital conversion means, said memory means and said digital/analog conversion means to output the analog audio signal from said digital/analog conversion means at a 1 multispeed which allows the user to accurately listen to the output analog audio signal.

In accordance with another aspect of the present invention, there is provided a digest playback method for a video cassette recorder comprising the steps of (a) discriminating a speed-change direction of an audio multispeed change equipment, initializing said audio multispeed change equipment in accordance with the discriminated result and determining analog/digital conversion and digital/analog conversion periods; (b) converting an analog audio signal into digital audio data at the same multispeed as that of a picture and writing the converted digital audio data; and (c) reading the digital audio data written at said step (b) in the written order or in the reverse order of the writing according to the discriminated speed-change direction, converting the read digital audio data into an analog audio signal at a 1 multispeed and outputting the converted analog audio signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
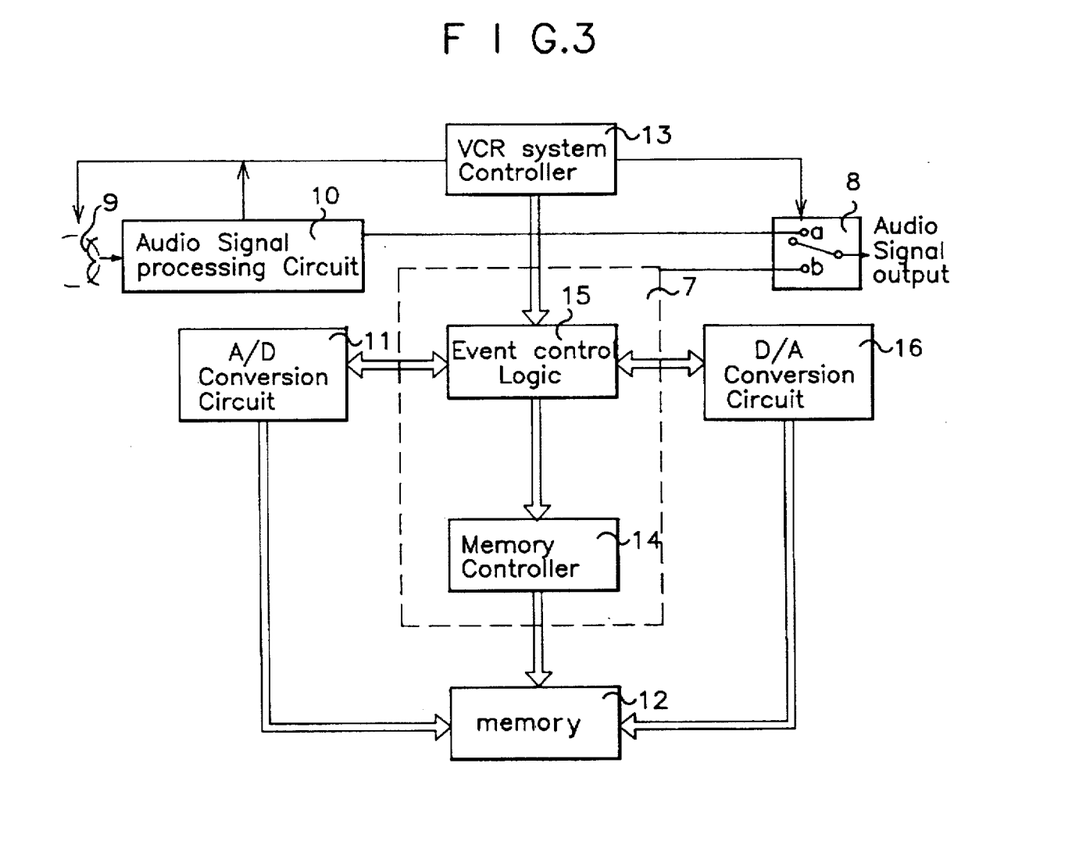
FIG. 3 is a block diagram of a digest playback apparatus for a VCR in accordance with a first embodiment of the present invention.

Referring to FIG. 3, there is shown a block diagram of a digest playback apparatus for a VCR in accordance with a first embodiment of the present invention. As shown in this drawing, the digest playback apparatus comprises an audio head 9 for reading an audio signal recorded on a video tape, an audio signal processing circuit 10 for removing a noise component from the audio signal read by the audio head 9 and restoring the noise-removed audio signal to its original state, and a VCR system controller 13 for outputting a plurality of control signals to control the entire operation of the VCR system. The plurality of control signals include speed-change multispeed and direction data and audio multispeed change mode ON/OFF data.

An analog/digital (A/D) conversion circuit 11 is provided in the digest playback apparatus to sample the analog audio signal from the audio signal processing circuit 10, sequentially compare the sampled values, with reference values and output digital audio data in accordance with the compared result.

A memory 12 is also provided in the digest playback apparatus to store the digital audio data from the A/D conversion circuit 11.

A digital/analog (D/A) conversion circuit 16 is also provided in the digest playback apparatus to convert the digital audio data read from the memory 12 into an analog audio signal.

A control circuit 7 is also provided in the digest playback apparatus to control the A/D conversion circuit 11, the memory 12 and the D/A conversion circuit 16 to output the analog audio signal from the D/A conversion circuit 16 at a 1 multispeed which allows the user to listen to the output analog audio signal.

A switch 8 is also provided in the digest playback apparatus to mute the analog audio signal from the D/A conversion circuit 16 in a mute mode under the control of the VCR system controller 13.

The control circuit 7 includes a memory controller 14 for controlling the memory 12 to write the digital audio data from the A/D conversion circuit 11 into the memory 12 and read the written digital audio data from the memory 12. Namely, the memory controller 14 addresses the memory 12 and sends it read/write commands in the read/write operations. The memory controller 14 also outputs an A/D conversion (ADC) mode ON signal and a D/A conversion (DAC) mode ON signal. Also, the control circuit 7 includes event control logic 15 for controlling conversion (event) frequencies and conversion (event) points of the A/D conversion circuit 11 and the D/A conversion circuit 16 in response to the speed-change multispeed and direction data, the audio multispeed change mode ON/OFF data from the VCR system controller 13, the A/D conversion mode ON signal and the D/A conversion mode ON signal from the memory controller 14.

The A/D conversion circuit 11, the event control logic 15, the D/A conversion circuit 16 and the memory controller 14 are contained in an audio multispeed change equipment (designated by the reference numeral 25 in FIG. 4), and the VCR system controller 13 and the memory 12 are the associated peripheral devices.

Figure 4:
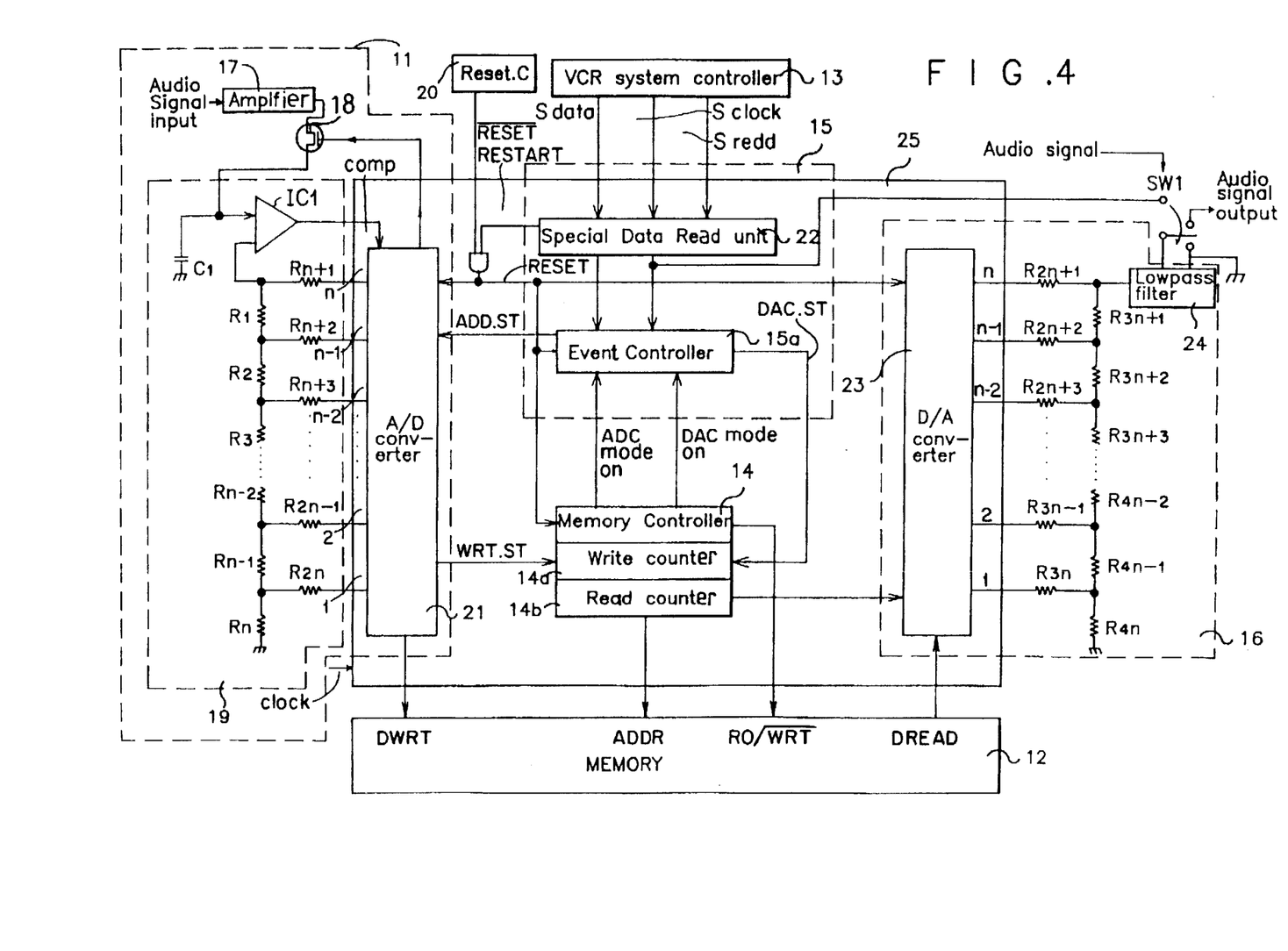
FIG. 4 is a detailed block diagram of the digest playback apparatus for the VCR in accordance with the first embodiment of the present invention.

Referring to FIG. 4, there is shown a detailed block diagram of the digest playback apparatus for the VCR in accordance with the first embodiment of the present invention. As shown in this drawing, the A/D conversion circuit 11 includes an amplifier 17 for amplifying the audio signal read by the audio head 9 by a predetermined amplification degree, a sample/hold FET 18 for sampling and holding the amplified audio signal from the amplifier 17, and a sequential comparison circuit 19 for sequentially comparing the sampled values from the sample/hold FET 18 with the reference values. The sequential comparison circuit 19 is provided with a plurality of resistors R1–R2n, a capacitor C1 and a comparator IC1. An A/D converter 21 is also provided in the A/D conversion circuit 11 to convert the sequentially compared values from the sequential comparison circuit 19 into the digital audio data (n bits).

A reset circuit 20 is connected to the audio multispeed change equipment 25 to initialize the audio multispeed change equipment 25 upon power-on.

The VCR system controller 13 is connected to the audio multispeed change equipment 25 to output all VCR system control signals including the speed-change multispeed and direction data and the audio multispeed change mode ON/OFF data.

The event control logic 15 includes a special data read unit 22 for reading the speed-change multispeed and direction data and the audio multispeed change mode ON/OFF data from the VCR system controller 13 and initializing the audio multispeed change equipment 25 upon the change of the speed-change multispeed and direction data or the audio multispeed change mode ON/OFF data. Also, the event control logic 15 includes an event controller 15a for controlling the conversion frequencies and conversion points of the A/D conversion circuit 11 and the D/A conversion circuit 16 in response to the speed-change multispeed and direction data and the audio multispeed change mode ON/OFF data read by the special data read unit 22, the A/D conversion mode ON signal, and the D/A conversion mode ON signal from the memory controller 14.

The memory 12 is adapted to store the n-bit digital audio data from the A/D conversion circuit 11 in each of m addresses, namely, m×n.

The memory controller 14 controls the memory 12 under the control of the event controller 15a to write the digital audio data from the A/D conversion circuit 11 into the memory 12 and read the written digital audio data from the memory 12 and outputs the A/D conversion mode ON signal and the D/A conversion mode ON signal to the event controller 15a.

The D/A conversion circuit 16 is adapted to convert the digital audio data read from the memory 12 into the analog audio signal. The D/A conversion circuit 16 includes a D/A converter 23 for converting the digital audio data read from the memory 12 into the analog audio signal. Also, the D/A conversion circuit 16 includes a plurality of resistors R2n+1-R4n and a low pass filter 24. The low pass filter 24 functions to remove a noise component from the analog audio signal from the D/A converter 23.

The memory controller includes a write counter 14a for performing a write address counting operation to address a location of the memory 12 in which the digital audio data from the A/D conversion circuit 11 is to be written, and a read counter 14b for performing a read address counting operation to address a location of the memory 12 from which the written digital audio data is to be read.

The switch 8 acts to mute the analog audio signal from the D/A conversion circuit 16 in the mute mode under the control of the VCR system controller 13.

Figure 5:
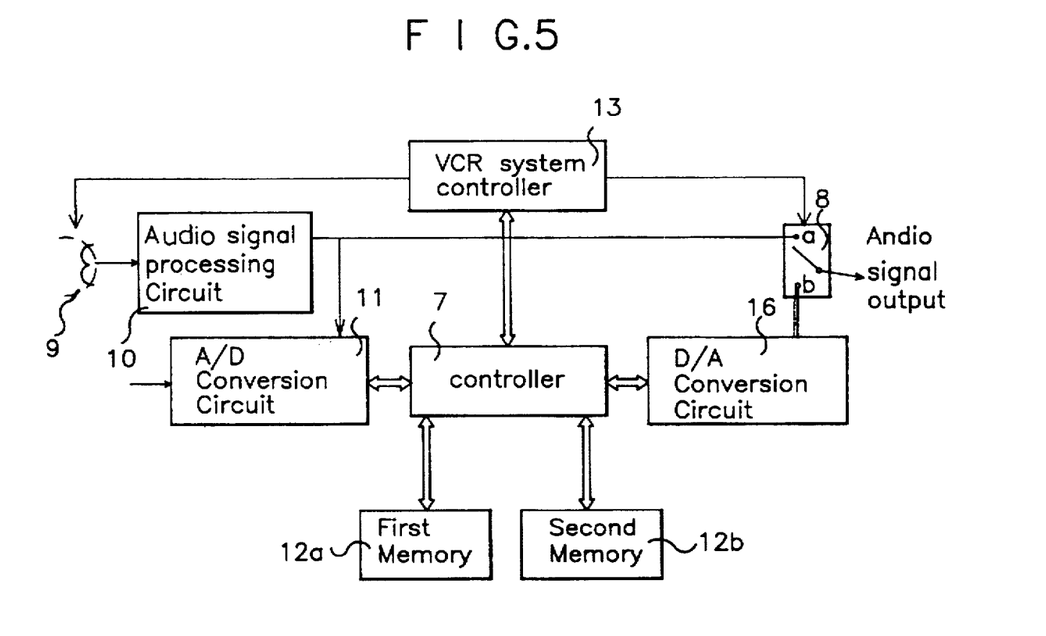
FIG. 5 is a block diagram of a digest playback apparatus for a VCR in accordance with a second embodiment of the present invention.

Referring to FIG. 5, there is shown a block diagram of a digest playback apparatus for a VCR in accordance with a second embodiment of the present invention. The construction of this second embodiment is substantially the same as that of the first embodiment in FIGS. 3 and 4, with the exception that two memories 12a and 12b of the same capacity are used instead of the memory 12. For this reason, there are different digest playback methods in accordance with the first and second embodiments of the present invention, as will be described in detail later.

Figure 6:
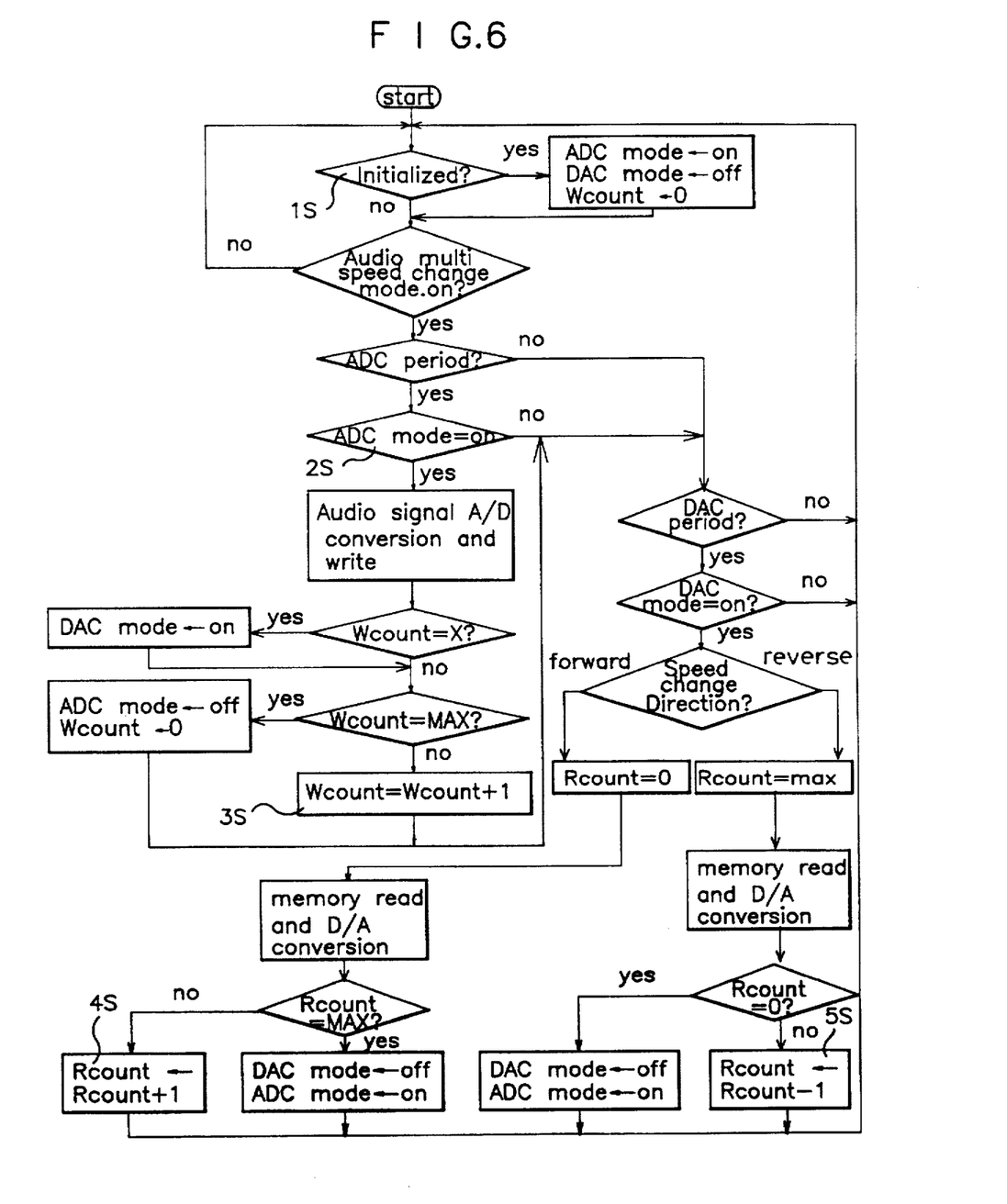
FIG. 6 is a flowchart illustrating an operation of the digest playback apparatus for the VCR in accordance with the first embodiment of the present invention.

The operation of the digest playback apparatus with the above-mentioned construction in accordance with the first embodiment of the present invention will hereinafter be described in detail with reference to FIGS. 4 and 6. FIG. 6 is a flowchart illustrating the operation of the digest playback apparatus for the VCR in accordance with the first embodiment of the present invention.

First, upon power-on, the reset circuit 20 initializes the audio multispeed change equipment 25, and the special data read unit 22 reads the speed-change multispeed and direction data and the audio multispeed change mode ON/OFF data from the VCR system controller 13. Then, the special data read unit 22 outputs the read speed-change multispeed and direction data and audio multispeed change mode ON/OFF data to the event control logic 15. At this time, if the read speed-change data are different from the previous data, namely, upon the change of the speed-change multispeed and direction data or the audio multispeed change mode ON/OFF data, the special data read unit 22 outputs a RESTART signal in a low (L) state to initialize the audio multispeed change equipment 25 at the step IS.

Upon receiving the speed-change multispeed and direction data and the audio multispeed change mode ON data from the special data read unit 22, the event controller 15a controls the A/D conversion event period and the D/A conversion event period. Then, at the step 2S, the event controller 15a outputs an A/D conversion signal ADC.ST to the A/D conversion circuit 11 at the controlled A/D conversion event period and a D/A conversion signal DAC.ST to the D/A conversion circuit 16 at the controlled D/A conversion event period. Noticeably, only when the event controller 15a receives the A/D conversion mode ON signal and the D/A conversion mode ON signal from the memory controller 14 and the audio multispeed change mode ON data from the special data read unit 22, can it output the A/D conversion signal ADC.ST and the D/A conversion signal DAC.ST.

The following table 1 shows the A/D conversion event frequency and the D/A conversion event frequency depending on VCR speed-change multispeed (picture multispeed).

As seen from the table 1, in the case where the picture is played back at n multispeed, the A/D conversion is performed at n * xHz, whereas the D/A conversion is performed at xHz. Namely, the D/A-converted audio signal is emitted at the 1 multispeed of the picture although the picture is played back faster at the n multispeed.

TABLE 1

| PICTURE MULTISPEED | ADC FREQUENCY | DAC FREQUENCY |
|---|---|---|
| * 1 | xHz | xHz |
| * 2 | 2 * xHz | . |
| * 3 | 3 * xHz | . |
| . | . | . |
| . | . | . |
| * n | n * xHz | . |

Therefore, the A/D conversion period is shorter than the D/A conversion period in the case where the picture multispeed is faster than the 1 multispeed.

In the A/D conversion circuit 11, the A/D converter 21 outputs a sampling gate pulse corresponding to the picture multispeed to a gate of the sample/hold FET 18 in response to the A/D conversion signal ADC.ST from the event controller 15a. The sample/hold FET 18 samples and holds the amplified audio signal from the amplifier 17 in response to the sampling gate pulse from the A/D converter 21. Then, the sequential comparison circuit 19 sequentially compares the sampled values from the sample/hold FET 18 with the reference values. The A/D converter 21 converts the sequentially compared values from the sequential comparison circuit 19 into the digital audio data by n bits and outputs the converted n-bit digital audio data to the memory 12. At the same time, the A/D converter 21 outputs a write signal WRT.ST to the memory controller 14 for the writing of the digital audio data into the memory 12.

Upon receiving the write start signal WRT.ST from the A/D converter 21 in the A/D conversion circuit 11, the memory controller 14 instructs the memory 12 to store the digital audio data from the A/D converter 21 in its location corresponding to a write address from the write counter 14a at the step 3S. The write address is initialized to 0 and then incremented to m by 1 by the write counter 14a. Namely, Wcount=Wcount+1.

On the other hand, upon receiving the D/A conversion signal DAC.ST from the event controller 15a, the memory controller 14 instructs the memory 12 to output the digital audio data (n bits) stored in its location corresponding to a read address from the read counter 14b.

Noticeably, the read address from the read counter 14b is outputted in different manners according to different VCR speed-change directions. Namely, if the VCR speed-change direction is forward, the read address of the read counter 14b is initialized to 0 to read the data from the memory 12 in the written order at the step 4S. On the contrary, in the case where the VCR speed-change direction is reverse, the read address of the read counter 14b is initialized to the maximum value m to read the data from the memory 12 in the reverse order of the writing at the step 5S.

In the D/A conversion circuit 16, the digital audio data read from the memory 12 is converted into the analog audio signal at the 1 multispeed by the D/A converter 23. Then, the low pass filter 24 removes the noise component from the analog audio signal from the D/A converter 23 and outputs the resultant audio signal to a speaker (not shown) through the switch 8.

Figure 7:
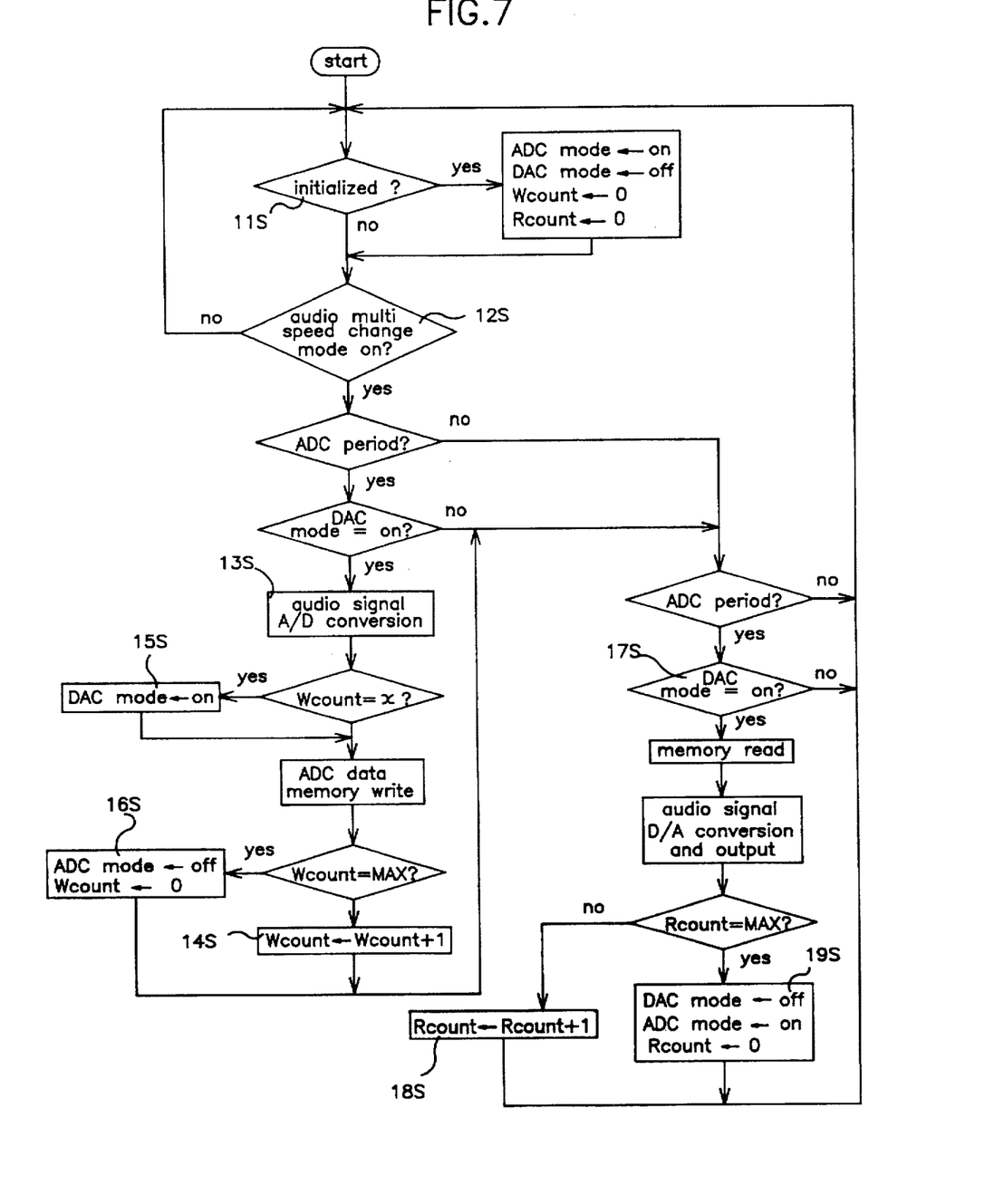
FIG. 7 is a flowchart illustrating an operation of outputting an audio signal at a 1 multispeed in a forward speed-change playback in accordance with the first embodiment of the present invention.

Now, the read addressing operation of the memory controller 14 based on the different VCR speed-change directions will hereinafter be described in more detail with reference to FIGS. 7 to 10. FIG. 7 is a flowchart illustrating the operation of outputting the audio signal at the 1 multispeed in the forward speed-change playback in accordance with the first embodiment of the present invention, and FIG. 9 is a timing diagram of the read and write operations of the memory 12 with respect to the picture on the basis of the operation of FIG. 7.

In the forward speed-change playback, the initialization is performed to turn on the ADC mode, turn off the DAC mode, set the write counter to 0 and set the read counter to 0 at the step 11S. If it is then checked at the step 12S that the audio multispeed change mode is ON. The A/D conversion circuit 11 A/D-converts the audio signal read by the audio head in response to the A/D conversion signal at the step 13S.

The digital audio data from the A/D conversion circuit 11 are sequentially written into the locations of the memory 12 corresponding to the addresses from the write counter 14a being incremented from 0 to m by 1 (Wcount=Wcount+1) at the step 14S. At the time that the write address from the write counter 14a reaches the maximum value m, the ADC mode is turned off and the write counter 14a is initialized to 0 at the step 16S.

Figure 9:
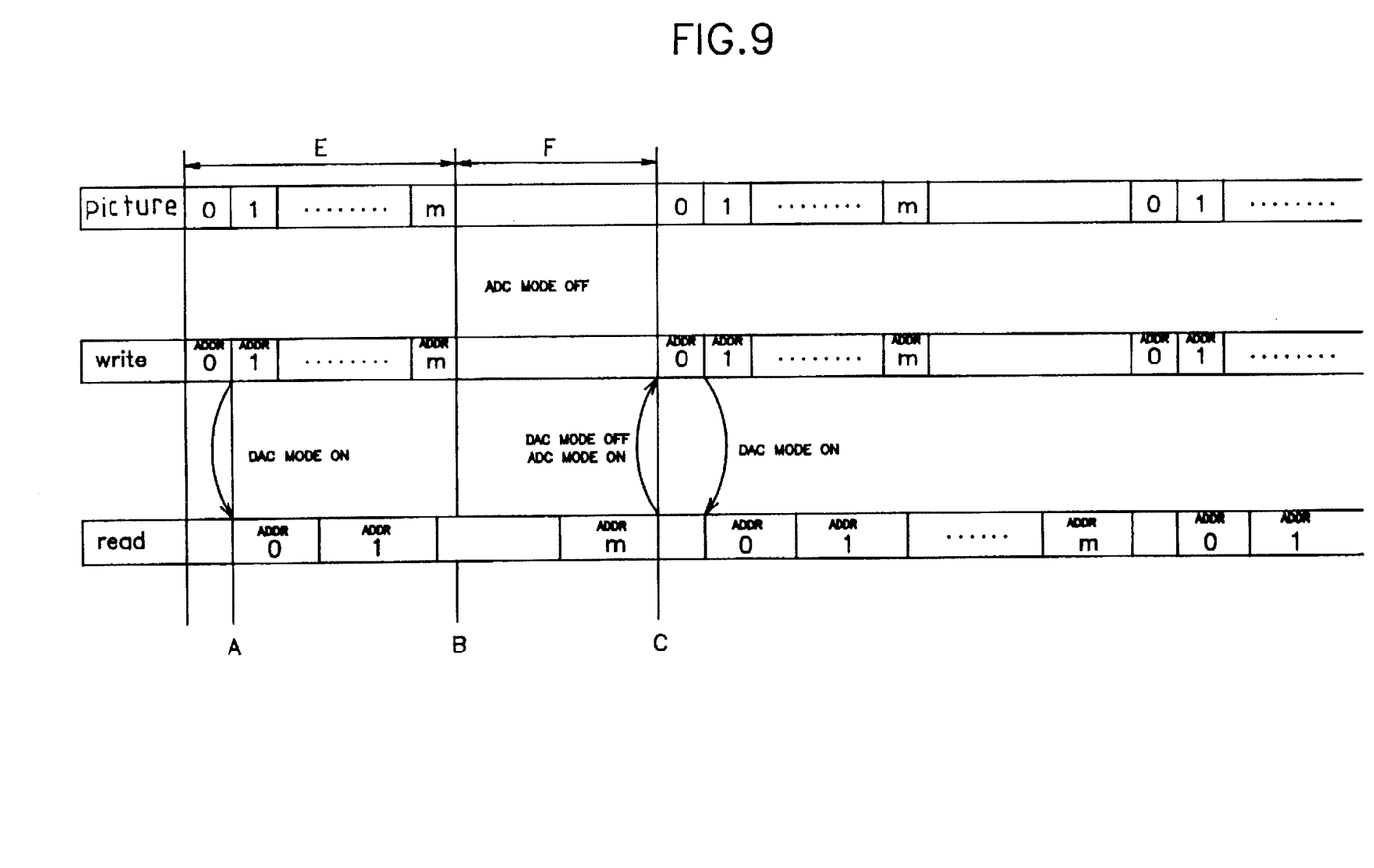
FIG. 9 is a timing diagram of read and write operations of a memory with respect to a picture on the basis of the operation of FIG. 7.

At the step 15S, the DAC mode is turned on when the write address from the write counter 14a becomes a predetermined value y during the data writing operation, where y is 1 in FIG. 9. Then, at the DAC period of the step 17S, the written digital audio data are sequentially read from the locations of the memory 12 corresponding to the addresses from the read counter 14b being incremented from 0 to m by 1 (Rcount=Rcount+1). The sequential digital audio data read from the memory 12 are D/A-converted at the 1 multispeed by the D/A conversion circuit 16 at the step 18S. At the time that the read address from the read counter 14b reaches the maximum value m, the DAC mode is turned off, the ADC mode is turned on and the read counter 14b is initialized to 0 at the step 19S.

With the above steps repeated, as shown in FIG. 9, the audio signal is converted into the digital signal in an interval E at the same speed as that of the picture. The ADC mode is turned off at the moment B and the DAC mode is turned on at the moment A, thereby causing the digital signal to be converted into the analog signal by the D/A conversion circuit 16. Then, at the moment C, the DAC mode is turned off and the ADC mode is again turned on. Therefore, with the above steps repeated, the user can readily grasp a synopsis of the speed-changed picture. Here, in an interval F between the moments B and C, the picture is displayed, whereas the audio signal is skipped.

Figure 8:
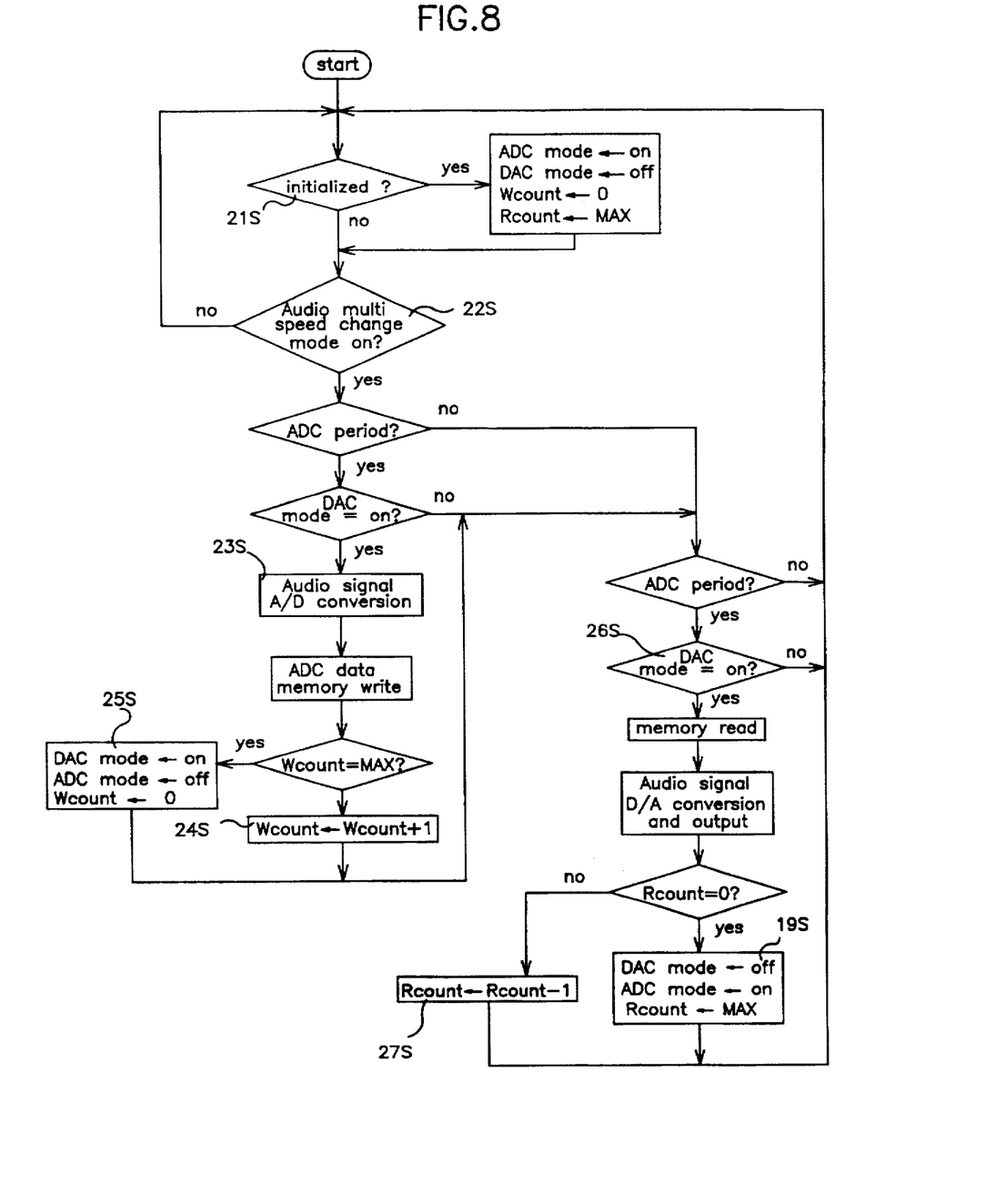
FIG. 8 is a flowchart illustrating an operation of emitting an the audio signal at the 1 multispeed in a reverse speed-change playback in accordance with the first embodiment of the present invention.
Figure 10:
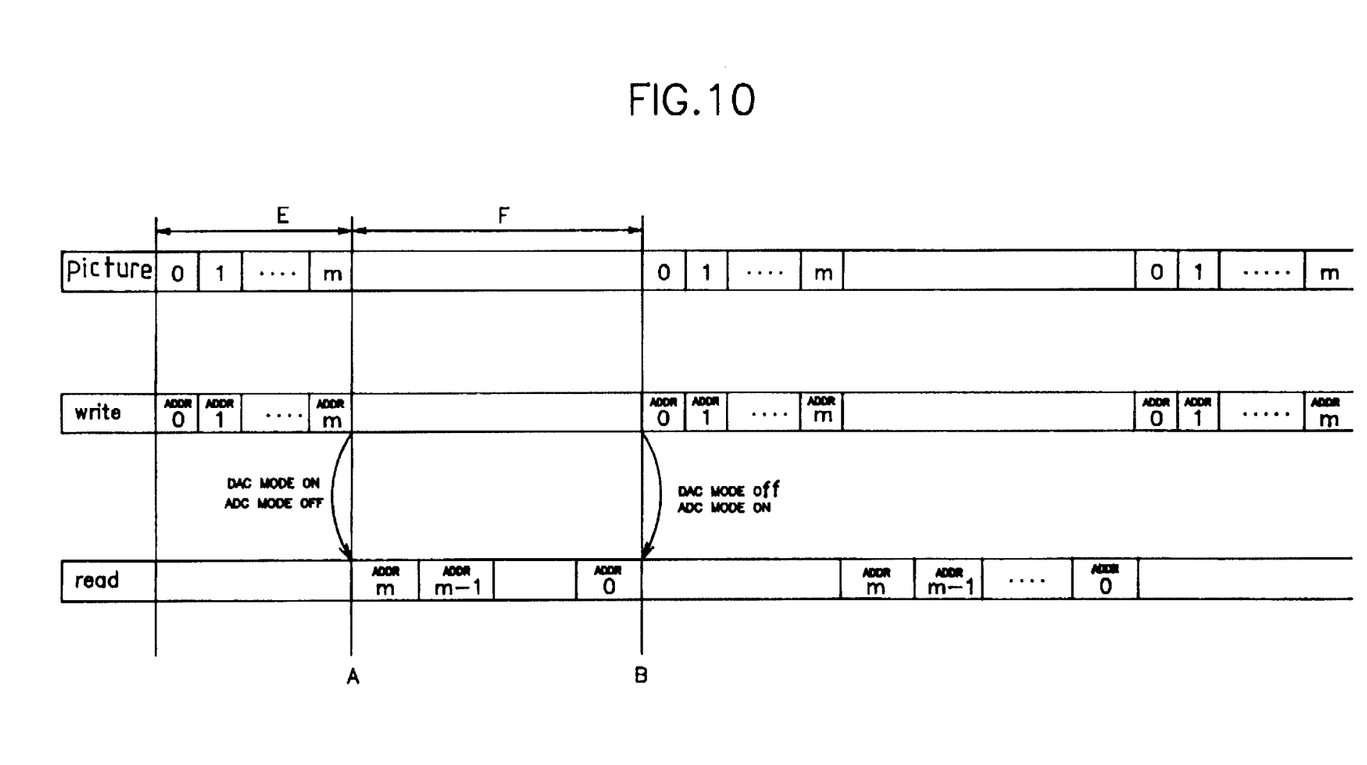
FIG. 10 is a timing diagram of the read and write operations of the memory with respect to the picture on the basis of the operation of FIG. 8.

FIG. 8 is a flowchart illustrating the operation of outputting the audio signal at the 1 multispeed in the reverse speed-change playback in accordance with the first embodiment of the present invention and FIG. 10 is a timing diagram of the read and write operations of the memory 12 with respect to the picture on the basis of the operation of FIG. 8.

In the reverse speed-change playback, the D/A conversion is performed in the reverse order of the A/D conversion to output the audio signal in the forward direction so that it can be understood by the user, although the picture is played back in the reverse direction.

At the step 21S, initialization is performed to turn on the ADC mode, turn off the DAC mode, set the write counter to 0 and set the read counter to the maximum value m. If it is then determined at the step 22S that the audio multispeed change mode is ON, the A/D conversion circuit 11 A/D-converts the audio signal read by the audio head in response to the A/D conversion signal at the step 23S.

The digital audio data from the A/D conversion circuit 11 are sequentially written into the locations of the memory 12 corresponding to the addresses from the write counter 14a being incremented from 0 to m by 1 (Wcount=Wcount+1) at the step 24S. At the time that the write address from the write counter 14a reaches the maximum value m, the ADC mode is turned off, the DAC mode is turned on and the write counter 14a is initialized to 0 at the step 25S.

Because the audio signal must be outputted in the forward direction so that it can be understood by the user, although the picture is played back in the reverse direction in the reverse speed-change playback, the DAC mode is turned on and the ADC mode is turned off when the write address from the write counter 14a becomes the maximum value m. Then, at the DAC period of the step 26S, the written digital audio data are sequentially read from the locations of the memory 12 corresponding to the addresses from the read counter 14b being decremented from m to 0 by 1 (Rcount=Rcount−1). The sequential digital audio data read from the memory 12 are D/A-converted at the 1 multispeed by the D/A conversion circuit 16 at the step 27S. At the time that the read address from the read counter 14b reaches 0, the DAC mode is turned off, the ADC mode is turned on and the read counter 14b is initialized to the maximum value m.

With the above steps repeated, as shown in FIG. 10, the audio signal is converted into the digital signal in an interval E at the same speed as that of the picture. The ADC mode is turned off and the DAC mode is turned on at the moment A that the A/D-converted data are written into all the locations of the memory 12 corresponding to the addresses of 0 to m. As a result, the written data are read from the memory 12 in the reverse order of the writing and then converted into the analog signal by the D/A conversion circuit 16. Then, at the moment B that the read address from the read counter 14b is 0, the DAC mode is turned off and the ADC mode is again turned on. Therefore, with the above steps repeated, the user can readily grasp a synopsis of the speed-changed picture. Here, in an interval F between the moments A and B, the picture is displayed, whereas the audio signal is skipped, in the same manner as that in the forward speed-change playback.

Figure 11:
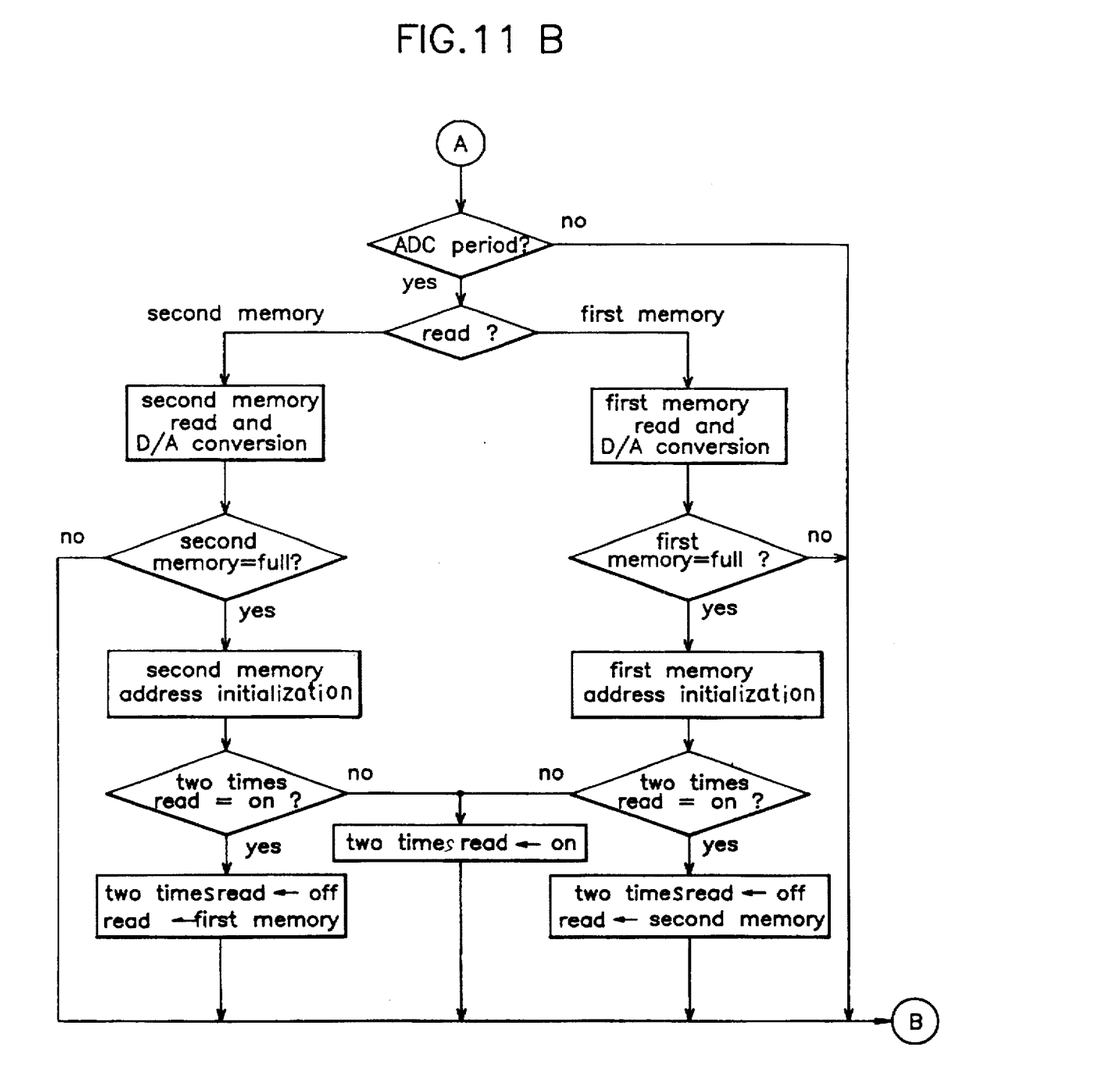
FIGS. 11A and 11B are flowcharts illustrating an operation of the digest playback apparatus for the VCR in accordance with the second embodiment of the present invention.
Figure 11A:
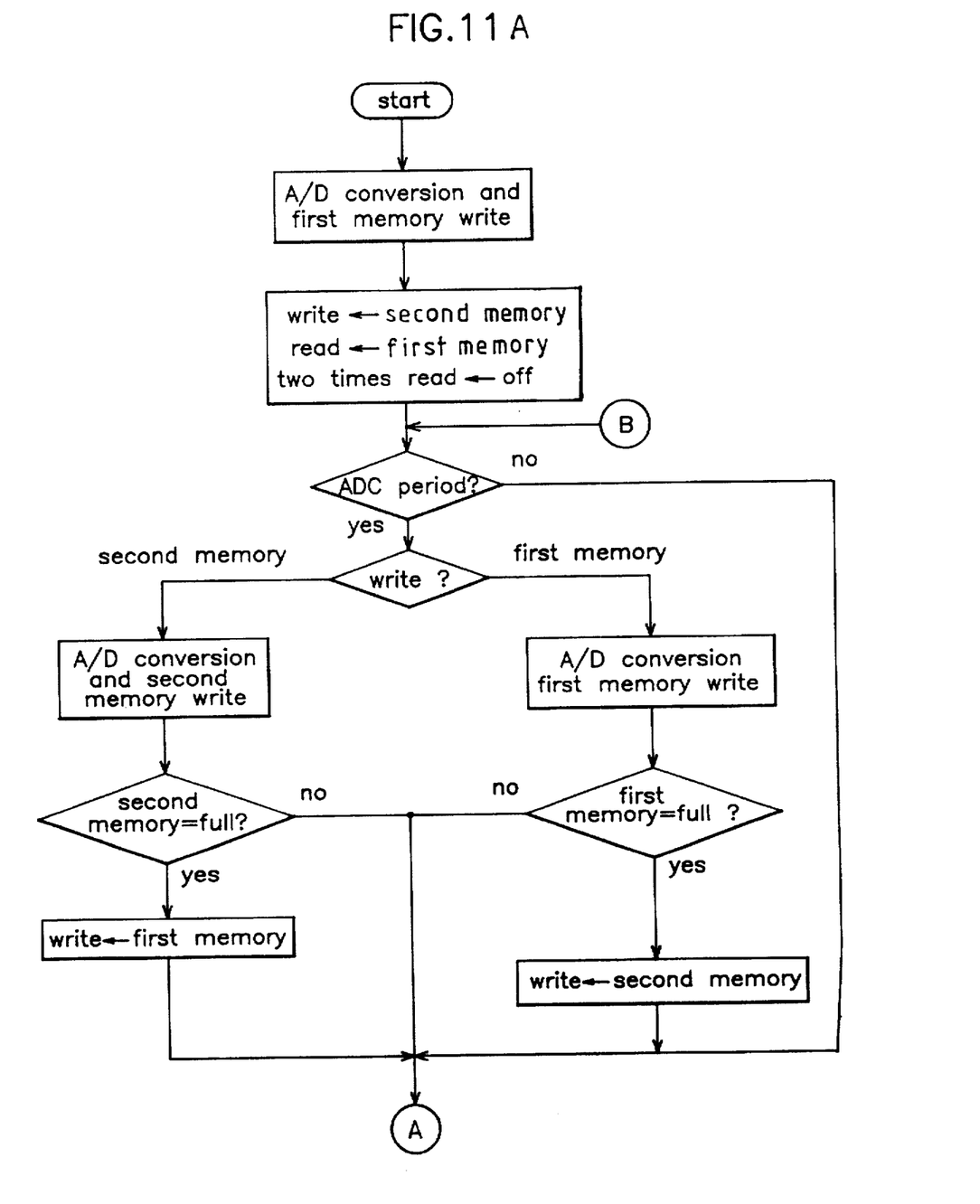
Figure 12:
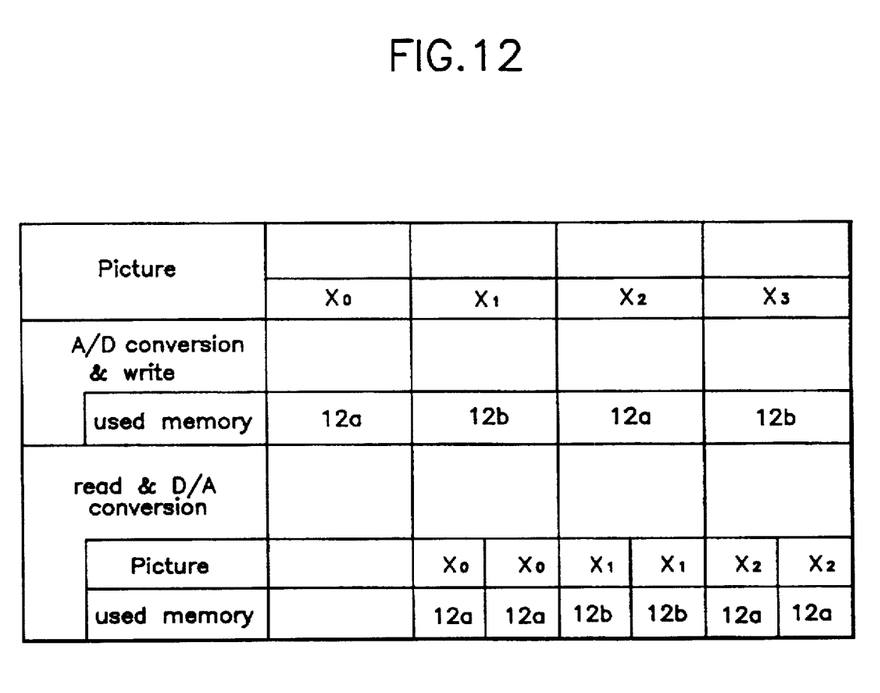
FIG. 12 is a timing diagram of read and write operations of memories with respect to a picture on the basis of the operation of FIGS. 11A and 11B.

FIGS. 11A and 11B are flowcharts illustrating the operation of the digest playback apparatus for the VCR in FIG. 5 in accordance with the second embodiment of the present invention, and FIG. 12 is a timing diagram of the read and write operations of the memories 12a and 12b with respect to the picture on the basis of the operation of FIGS. 11A and 11B.

In a ½ multispeed playback of the VCR, the audio signal is read by the audio head and then converted into the digital data at the ½ multispeed. The memory controller 14 first selects the first memory 12a to write the full digital data into the first memory 12a. Then, the memory controller 14 selects the second memory 12b to write the full digital data into the second memory 12b. At the same time, the digital audio data are read from the first memory 12a and then converted into the analog audio signal.

Noticeably, a read frequency is twice a write frequency so that the same audio signal from one of the memories 12a and 12b can repeatedly be outputted two times while the other performs the writing operation.

In other words, in the ½ multispeed playback of the VCR, the audio signal being played back at the ½ multispeed is converted into the digital audio data by the A/D conversion circuit 11 under the control of the event control logic 15 in the control circuit 7. Then, the memory controller 14 in the control circuit 7 addresses the first memory 12a to write the digital audio data from the A/D conversion circuit 11 into the addressed locations of the first memory 12a at a ½ multispeed frequency X Hz.

At that time that the digital audio data from the A/D conversion circuit 11 are fully written into the first memory 12a, the memory controller 14 in the control circuit 7 addresses the second memory 12b to write the digital audio data from the A/D conversion circuit 11 into the addressed locations of the second memory 12b at the ½ multispeed frequency X Hz. At the same time, the memory controller 140 gives the first memory 12a the read command. In response to the read command from the memory controller 140, the written digital audio data are read from the first memory 12a at the read frequency 2X Hz twice as fast as the write frequency X Hz and then converted into the analog signal by the D/A conversion circuit 16. As a result, the same audio signal can repeatedly be emitted two times.

The data reading interval of the first memory 12a is the same as the full writing interval of the second memory 12b because the same data are repeatedly read two times from the first memory 12a at the read frequency 2X Hz and the data are written into the second memory 12b at the write frequency X Hz.

Then, when the same data are repeatedly read two times from the first memory 12a and the data are fully written into the second memory 12b, the memory controller 14 initializes the address, and addresses the first memory 12a for the data writing and the second memory 12b for the data reading, respectively. With the above steps repeated, the same audio signal is repeatedly outputted two times at the 1 multispeed while the picture is played back at the ½ multispeed.

In other words, in the case where the video and audio signals are played back in the ½ multispeed playback mode, the audio signal is A/D-converted and fully written into the addresses O-HAX of the first memory 12a at the frequency X Hz, and the written digital data are then read from the first memory 12a and D/A-converted at the frequency 2X Hz. As a result, the audio signal is emitted at the 1 multispeed so that it can be understood by the user.

In accordance with the second embodiment of the present invention, one of the first and second memories 12a and 12b performs the writing operation while the other performs the reading operation. During picture (X0, X1, X2, . . . ), the audio signal is A/D-converted and then written at the ½ multispeed, whereas the written digital data are repeatedly read two times and then D/A-converted at the 1 multispeed. Namely, the audio signal corresponding to the picture X0 is repeatedly outputted two times while the picture X1 is played back. Also, the audio signal corresponding to the picture X1 is repeatedly outputted two times while the picture X2 is played back.

Similarly to that of the first embodiment of the present invention, the read addressing operation of the memory controller 14 based on the forward and reverse VCR speed-change directions can be performed as shown in FIGS. 7 and 8.

Figure 13:
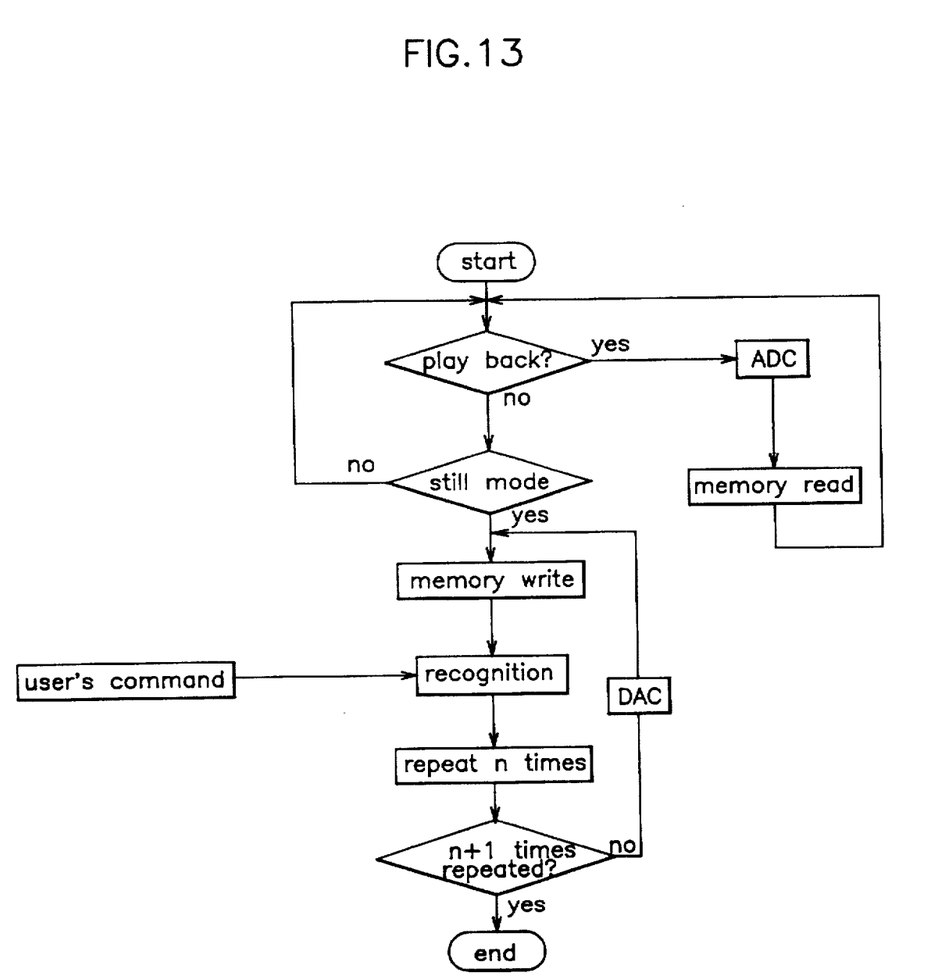
FIG. 13 is a flowchart illustrating a digest playback method for a VCR in accordance with a third embodiment of the present invention.

Referring to FIG. 13, there is shown a flowchart illustrating a digest playback method for a VCR in accordance with a third embodiment of the present invention. In this third embodiment, the audio signal is emitted in a still mode according to a user's selection so that it can be understood by the user.

In the normal playback mode, in FIG. 3, the audio signal recorded on the video tape is read by the audio head 9 and then applied to the audio signal processing circuit 10. The audio signal processing circuit 10 removes the noise component from the audio signal read by the audio head 9 and restores the noise-removed audio signal to its original state. The resultant analog audio signal from the audio signal processing circuit 10 is applied to the A/D conversion circuit 11 and the switch 8.

At this time, a movable contact of the switch 8 is connected to a fixed contact a thereof under the control of the VCR system controller 13 to output the analog audio signal from the audio signal processing circuit 10 externally. Also, the analog audio signal from the audio signal processing circuit 10 is converted into the digital audio data by the A/D conversion circuit 11. The digital audio data from the A/D conversion circuit 11 are written into the memory 12 and then read therefrom in the written order at a predetermined interval under the control of the control circuit 7.

Under this condition, in the case where the still mode is selected by the user, the VCR system controller 13 stops the picture, controls the switch 8 such that the movable contact of the switch 8 is connected to a fixed contact b thereof, and transmits a control signal to the control circuit 7.

In response to the control signal from the VCR system controller 13, the control circuit 7 controls the memory 12 and the D/A conversion circuit 16. As a result, the digital audio data are read from the memory 12 and then converted into the analog audio signal by the D/A conversion circuit 16. The analog audio signal from the D/A conversion circuit 16 is outputted externally though the switch 8. At this time, a predetermined portion of the digital audio data stored in the memory 12 may be repeatedly emitted by a desired number of times in compliance with the user's request.

On the other hand, in the case where the mute mode is selected in the still mode by the user, the movable contact of the switch 8 is connected to the fixed contact a thereof under the control of the VCR system controller 13.

As apparent from the above description, according to the present invention, the audio signal is outputted at the 1 multispeed which allows the user to accurately listen to the output audio signal, while the picture is played back fast. Therefore, the user can grasp a synopsis of the speed-changed picture. Also, the same audio signal is repeatedly outputted two times at the 1 multispeed while the picture is slow played back at the ½ multispeed. This has the effect of increasing a studying efficiency through the VCR. Further, the user can repeatedly listen to the desired portion of the audio signal in the still mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A digest playback apparatus for a video cassette recorder comprising:

system control means for outputting a plurality of control signals to control the operation of a video cassette recorder system, the plurality of control signals including speed-change multispeed and direction data and audio multispeed change mode ON/OFF data;

analog/digital conversion means for converting an analog audio signal read by an audio head into digital audio data;

memory means for storing the digital audio data from said analog/digital conversions means;

digital/analog conversion means for converting the digital audio data stored in said memory means into an analog audio signal;

event control logic means for controlling conversion frequencies and conversion points of said analog/digital conversion means and said digital/analog conversion means in response to the speed-change multispeed and direction data and the audio multispeed change mode ON/OFF data from said system control means and performing initialization upon the change of a speed-change mode; and memory control means for controlling said memory means under the control of said event control logic means to write the digital audio data from said analog/digital conversion means into said memory means and read the written digital audio data from said memory means in different manners according to speed-change directions;

wherein said analog/digital conversion means includes:

an amplifier for amplifying the audio signal read by said audio head by a predetermined amplification degree;

a sample/hold FET for sampling and holding the amplified audio signal from said amplifier;

a sequential comparison circuit for sequentially comparing the sampled values from said sample/hold FET with reference values; and an analog/digital converter for converting the sequentially compared values from said sequential comparison circuit into the digital audio data.

2. A digest playback apparatus for a video cassette recorder comprising:

system control means for outputting a plurality of control signals to control the operation of a video cassette recorder system, the plurality of control signals including speed-change multispeed and direction data and audio multispeed change mode ON/OFF data;

analog/digital conversion means for converting an analog audio signal read by an audio head into digital audio data;

memory means for storing the digital audio data from said analog/digital conversions means;

digital/analog conversion means for converting the digital audio data stored in said memory means into an analog audio signal;

event control logic means for controlling conversion frequencies and conversion points of said analog/digital conversion means and said digital/analog conversion means in response to the speed-change multispeed and direction data and the audio multispeed change mode ON/OFF data from said system control means and performing initialization upon the change of a speed-change mode; and memory control means for controlling said memory means under the control of said event control logic means to write the digital audio data from said analog/digital conversion means into said memory means and read the written digital audio data from said memory means in different manners according to speed-change directions:

wherein said event control logic means includes:

a special data read unit for reading the speed-change multispeed and direction data and the audio multispeed change mode ON/OFF data from said system control means and initializing said analog/digital conversion means, said digital/analog conversion means and said memory control means upon the change of the speed-change multispeed and direction data or the audio multispeed change mode ON/OFF data; and an event controller for controlling the conversion frequencies and conversion points of said analog/digital conversion means and said digital/analog conversion means in response to the speed-change multispeed and direction data and the audio multispeed change mode ON/OFF-data read by said special data read unit and an analog/digital conversion mode ON signal and a digital/analog conversion mode ON signal from said memory control means.

3. A digest playback apparatus for a video cassette recorder as set forth in claim 2, wherein said event controller controls the conversion frequency of said analog/digital conversion means to be the same as a picture multispeed and controls the conversion frequency of said digital/analog conversion means to be a 1 multispeed regardless of the picture multispeed.

4. A digest playback apparatus for a video cassette recorder as set forth in claim 2, wherein said event controller skips the output of the audio signal for a period in which the analog/digital conversion is not performed.

* * * * *